United States Patent [19]

Bergey

[11] Patent Number: 5,505,589
[45] Date of Patent: Apr. 9, 1996

[54] CONTROLLABLE VARIABLE TWIST ROTOR BLADE ASSEMBLY

[76] Inventor: Karl H. Bergey, Rte. 1, Box 151B, Norman, Okla. 73072

[21] Appl. No.: 366,079
[22] Filed: Dec. 28, 1994
[51] Int. Cl.⁶ ..................................... F01D 7/00
[52] U.S. Cl. ................. 416/147; 416/132 R; 416/139
[58] Field of Search ........................... 415/23, 24, 104, 415/132, 139, 147

[56] References Cited

U.S. PATENT DOCUMENTS

| | | |
|---|---|---|
| 1,427,012 | 8/1922 | Page . |
| 1,960,141 | 5/1934 | Ascanio . |
| 1,967,461 | 7/1934 | Ballew .................................. 416/139 |
| 2,161,699 | 6/1939 | Cierva .................................. 416/139 |
| 2,324,569 | 7/1943 | Everts .................................. 416/139 |
| 2,455,866 | 12/1948 | Kaman . |
| 2,668,595 | 2/1954 | Kaman . |
| 2,917,255 | 12/1959 | Boyd .................................. 416/132 |
| 2,951,544 | 9/1960 | Kaman .................................. 416/147 |
| 3,144,907 | 8/1964 | Lubben et al. . |
| 3,207,228 | 9/1965 | Spielman . |
| 3,442,493 | 5/1969 | Smith, Jr. . |
| 3,902,821 | 9/1975 | Robinson . |
| 4,099,691 | 7/1978 | Swanson et al. . |
| 4,189,120 | 2/1980 | Wang . |
| 4,202,519 | 5/1980 | Fletcher . |
| 4,291,235 | 9/1981 | Bergey, Jr. et al. . |

FOREIGN PATENT DOCUMENTS 512363   1/1955   Italy ........................................ 416/139

Primary Examiner—John T. Kwon
Attorney, Agent, or Firm—Dunlap & Codding

[57] ABSTRACT

A controllable variable twist rotor blade assembly wherein the twist along the span of the blade is continuously variable and may be controlled either manually by the pilot or automatically according to data input from flight sensors monitoring flight parameter data. The continuously variable twist of the blade is controlled by an out-of-plane weight assembly having a weight member which is selectively movable between a first position and a second position relative to the elastic axis of the blade so as to optimize the twist of the blade during various flight conditions.

16 Claims, 3 Drawing Sheets

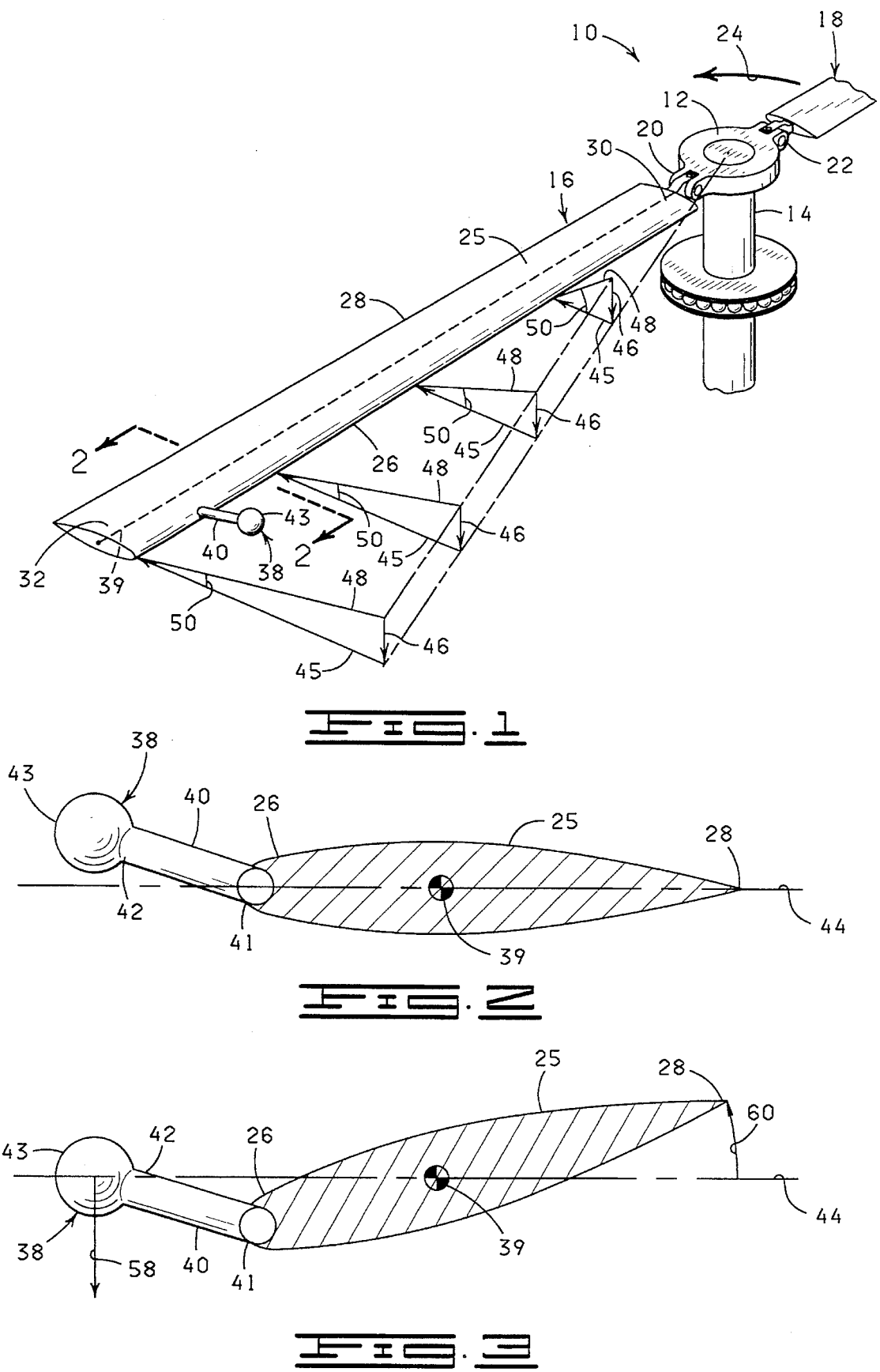

PILOT INPUT 5,505,589

CONTROLLABLE VARIABLE TWIST ROTOR BLADE ASSEMBLY

BACKGROUND OF THE INVENTION

1. Field of Invention

The present invention relates generally to blade assemblies for rotary wing aircraft, and more particularly, but not by way of limitation, to an improved blade assembly for rotary wing aircraft wherein the blade may be controllably twisted to various positions in flight to optimize the angle of attack along the span of the blade for various flight conditions.

2. Description of Related Art

The lift developed by a conventional aircraft wing depends primarily on two factors: the angle of attack of the wing and the velocity of the air in relation to the wing. In the case of a rotary wing aircraft such as a helicopter, the air velocity in relation to the wing is produced by a combination of aircraft motion and the rotation of rotor blades.

The air velocity over a particular section of the blade, referred to herein as a blade element, is a function of the distance of the blade element from the rotational axis of the rotor. In other words, air velocity is greater at the outer end of the blade than it is near the rotational axis of the rotor since the speed of the outer end of the blade is greater than the speed of the blade near the rotational axis of the rotor. As a result, each blade of a rotor assembly may be formed so that it is twisted about its longitudinal axis in order to maintain a favorable angle of attack along the span of the blade.

Helicopter and tilt-rotor blades are supported in bearings that allow the blades to be rotated about their longitudinal axis. This rotation allows the pilot to make a gross change in blade pitch, either collectively or cyclically, in order to control the total lift and horizontal flight direction of the aircraft. This rotation of the entire blade does not, however, allow each blade to be variably twisted so as to set each blade at an optimum pitch at each blade element along the span of each blade for a specific flight condition.

The optimum performance of a rotor blade assembly occurs when the angle of attack of each blade element along the span of each blade is related to the angle of other blades in such a way as to provide a consistent inflow/outflow velocity across the rotational plane of the blades. This requires each blade element along the span of each blade of the rotary blade assembly to have the proper angle of attack in relation to the air velocity at that particular blade element. For a rigid blade, the twist distribution is constant regardless of the flight conditions. Thus, the twist can be optimized for only one flight condition. For example, if hover performance is most critical, blade twist is optimized for airflow conditions that prevail during hover, with the consequence of degraded performance in all other flight conditions. Similarly, optimization of blade twist for high speed cruise degrades performance in all other flight conditions, including hover.

In addition, the ride quality of a helicopter with a fixed blade pitch distribution is degraded by the non-optimum angle of attack of the individual blade elements from root to tip, and by the inability of relatively more rigid blade systems to respond to gusts or other turbulence through which the helicopter may be flying. If the blade angles can respond to these varying flight conditions in such a way as to minimize short-term fluctuations in spanwise lift, the ride quality will be improved throughout the range of the flight conditions.

As an alternative to a blade having a fixed or constant twist, a blade which can be variably twisted about the longitudinal axis of the blade can provide optimum blade pitch at each blade element along the span of the blade for different flight conditions. However, in order for the blades to have the potential for variable twist, they must be designed with a controlled amount of torsional flexibility. Unfortunately, torsional flexibility brings with it the disadvantage of making the blades more susceptible to torsional flutter, a dynamic interaction between aerodynamic, flexural and mass properties of the blades. Torsional flutter can be described as a self-sustaining torsional vibration of the blades in which the blade pitch varies above and below acceptable limits at relatively high frequency and in such a way as to decrease the aerodynamic performance of the blade and impose high structural loads on the blade.

To this end, a need has long existed for an improved rotor blade assembly which allows a torsionally flexible blade to be controlled in flight to optimize flight performance while also diminishing the likelihood of flutter. It is to such an improved rotor blade assembly that the present invention is directed.

BRIEF DESCRIPTION OF THE DRAWINGS

FIG. 1 is a perspective view of a helicopter blade assembly constructed in accordance with the present invention.

FIG. 2 is a cross sectional view taken at 2—2 in FIG. 1 illustrating the blade in a non-rotating condition and an out-of-plane weight member located above the plane of rotation of the elastic axis of the blade.

FIG. 3 is a cross sectional view of the helicopter blade assembly of FIG. 1 wherein the blade is shown in a rotating condition.

DETAILED DESCRIPTION

Figure 4:
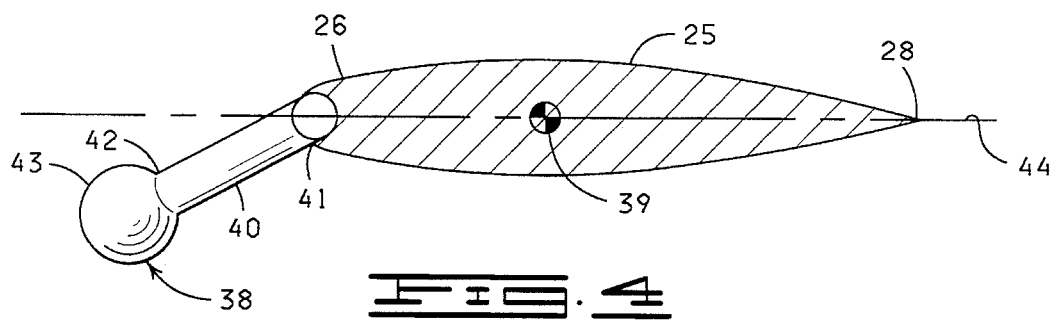
FIG. 4 is a cross sectional view of the blade of FIG. 1 showing the blade in a non-rotating condition and the out-of-plane weight member located below the plane of rotation of the elastic axis of the blade.

FIG. 1 shows a rotor assembly constructed in accordance with the present invention and generally designated by the reference numeral 10. The rotor assembly 10 is utilized on a rotary wing aircraft, such as a helicopter or tilt-rotor aircraft, and includes a hub 12 affixed to a drive shaft 14 which is rotated by a prime mover (not shown). A pair of rotor blade assemblies 16 and 18 are connected to the hub 12 via a pair of articulated hinges 20 and 22, respectively. The articulated hinges 20 and 22 function in the manner of universal joints thereby allowing for leading, lagging and flapping of the blade assemblies 16 and 18 in a manner well known in the art. The blade assemblies 16 and 18 are rotated about the hub 12 in the direction indicated by the arrow 24.

It will be appreciated that a helicopter rotor assembly employs a plurality of rotor blade assemblies consisting of two, three or more rotor blade assemblies, and that each of the rotor blade assemblies 16 and 18 is identical in construction. Therefore, although a pair of blade assemblies 16 and 18 are shown, only one blade assembly 16 will be referred to hereinafter in describing and explaining the features and functions of both blade assemblies 16 and 18.

The blade assembly 16 includes a torsional flexible blade 25 having a leading edge 26, a trailing edge 28, a radially inner fixed end 30, and a radially outer free end 32. An elastic axis 39 of the blade 25 extends through the torsionally flexible blade 25. The elastic axis 39 of the blade 25 is the radial axis about which the blade 25 will twist when a purely torsional force is applied to the blade 25.

During rotation of the rotor assembly 10, the pitch of the blade assembly 16 is cyclically controlled in order to control the vertical lift and to achieve horizontal flight. This cyclical control of the pitch of the blade assembly 16, as well as the use of the articulated hinge 20 as briefly mentioned above, is well known in the art. Thus, no further description of their various components or their operation is believed necessary in order to enable one skilled in the art to understand the rotor assembly 10 of the present invention and the relationship of the rotor assembly 10 to a rotary wing aircraft.

Referring now to FIGS. 1–5, the blade assembly 16 is provided with an out-of-plane weight assembly 38 positioned ahead of the leading edge 26 for controlling the torsional flex of the blade 25 in a manner which will be discussed in detail hereinafter. The out-of-plane weight assembly 38 includes a rigid body member 40 having a first end 41 and a second end 42. The first end 41 is pivotally mounted to the blade 25 along the leading edge 26 thereof and a weight member 43 is connected to the second end 42 of the body member 40 so as to be positioned ahead of the leading edge 26. It is desirable that the out-of-plane weight assembly 38 be located in close proximity to the radially outer free end 32 of the blade 25 so that the angle of attack of the blade 25 is varied along the entire length of the torsionally flexible blade 25. The out-of-plane weight assembly 38 is selectively movable between a first position where the weight member 43 is positioned above a plane of rotation 44 of the blade 25 (FIG. 2) and a second position where the weight member 43 is positioned below the plane of rotation 44 of the blade 25 (FIG. 4). It will be understood that the out-of-plane weight assembly 38 is selectively movable between the first and second positions and to positions therebetween.

As will be described in greater detail hereinafter, the out-of-plane weight assembly 38 allows a twisting moment to be applied to the radially outer free end 32 of the blade 25 when the blade 25 is in the rotating condition. This twisting moment causes a spanwise twist in the blade 25. The magnitude of the twisting moment and, therefore, the degree of twist imparted to the blade 25 is dependent on the length of the body member 40 of the out-of-plane weight assembly 38, the weight of the weight member 43 of the out-of-plane weight assembly 38, the angle at which the weight member 43 of the out-of-plane weight assembly 38 is disposed from the blade 25, and the centrifugal force acting on the out-of-plane weight assembly 38 because of the blade rotation about the drive shaft 14.

Before explaining the theory and manner of operation of the blade assembly 16, additional reference must be made to FIG. 1 to define certain terms and relationships necessary to understand the orientation of the rotor assembly 10 and the direction and magnitude of certain forces acting upon the blade assemblies 16 and 18 thereof.

The rotation of the blade 25 produces a wind velocity vector 45 and air passing through the plane of rotation 44 produces an inflow velocity vector 46. These vectors are added to produce a resultant relative wind vector 48. The relative wind vector 48, as well as an inflow angle 50 thereof, varies along the length of the blade 25; that is, the relative wind vector 48 increases from the radially inner fixed end 30 to the radially outer free end 32 and the inflow angle 50 decreases from the radially inner fixed end 30 to the radially outer free end 32. As stated above, it is this spanwise difference in the relative wind vector 48 that creates the need for a blade 25 having a variable twist. By employing the system of the present invention, the relative wind vector 48 is more uniformly maintained across the span of the blade 25. By controlling the twist of the blade 25, the blade 25 can be optimized for varying flight conditions.

The term "continuously varied" as used herein is to be understood to mean that the variation in pitch differs along the span of the blade 25 from a first variation adjacent the out-of-plane weight assembly 38 to a second variation at the radially inner fixed end 30, the first variation being greater than the second variation. In other words, with the entire blade 25 being torsionally flexible, the pitch is continuously varied along the entire span of the blade 25 between a zero pitch variation at the radially inner fixed end 30 and a maximum pitch variation adjacent the out-of-plane weight assembly 38.

Referring more specifically to FIG. 2, the blade 25, the body member 40 and the weight member 43 of the out-of-plane weight assembly 38 are depicted with the blade 25 in a non-rotating condition with the out-of-plane weight assembly 38 positioned above the plane of rotation 44 of the blade 25. The out-of-plane weight assembly 38 is attached to the leading edge 25 of the blade 25 so as to be located forward of the elastic axis 39 of the blade 25 to reduce the likelihood of flutter. However, it should be understood that the out-of-plane weight assembly 38 can be attached to the trailing edge 28 and thus located rearward of the elastic axis 39 of the blade 25 without departing from the scope and spirit of the present invention.

FIG. 3 is a cross sectional view of the blade 25 showing the twisting effect on the blade 25 when the blade 25 is in the rotating condition and when the weight member 43 of the out-of-plane weight assembly 38 is initially positioned above the plane of rotation 44 of the blade 25. A component, indicated by arrow 58, of the centrifugal force acting on the weight member 43 due to the rotation of the blade 25 tends to move the weight member 43 toward the plane of rotation 44 of the blade 25. As the weight member 43 of the out-of-plane weight assembly 38 approaches the plane of rotation 44 of the blade 25, the torsionally flexible blade 25 is twisted about the elastic axis 39 thereby resulting in a negative angle of twist 60 about the elastic axis 39. The blade 25 is therefore twisted to the position indicated in FIG. 3, wherein the pitch is continuously varied between a zero pitch variation at the radially inner fixed end 30 and a maximum pitch variation adjacent the out-of-plane weight assembly 38.

FIG. 4 shows a cross-section of the blade 25 wherein the blade 25, the body member 40 and weight member 43 of the out-of-plane weight assembly 38 are depicted as if the blade 25 is in a non-rotating condition with the out-of-plane weight assembly 38 positioned below the plane of rotation 44. As will be discussed hereinafter, positioning the weight member 43 in this manner will cause the blade 25 (when the blade 25 is in the rotating condition) to twist in the opposite direction than the direction the blade 25 twisted when the weight member 43 was positioned above the plane of rotation 44 of the blade 25.

Figure 5:
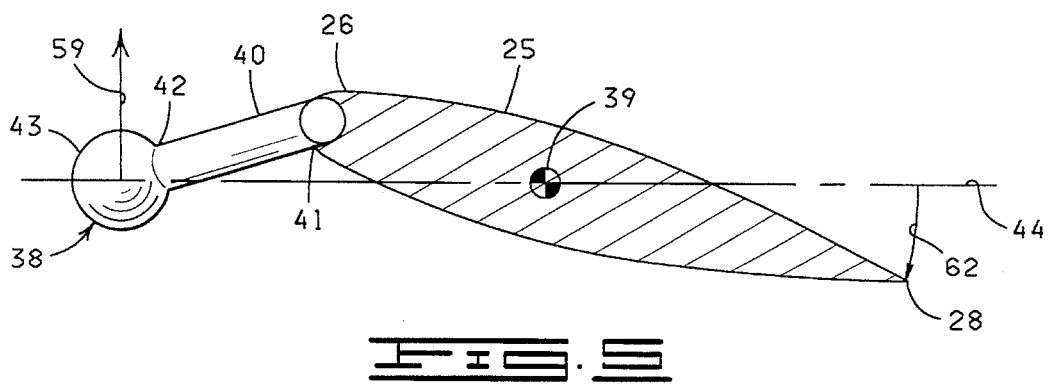
FIG. 5 is a cross sectional view of the helicopter blade assembly of FIG. 1 wherein the blade is shown in a rotating condition.

FIG. 5 is a cross sectional view of the blade 25 showing the twisting effect on the blade 25 when the blade 25 is in the rotating condition and when the weight member 43 of the out-of-plane weight assembly 38 is disposed below the plane of rotation 44 of the blade 25. A component, indicated by arrow 59, of the centrifugal force acting on the weight member 43 due to the rotation of the blade 25 tends to move the weight member 43 toward the plane of rotation 44 of the blade 25. Since the weight member 43 is disposed below the plane of rotation 44 of the blade 25, this component 59 of centrifugal force acts in the opposite direction as the component 58 of centrifugal force shown in FIG. 4. As the weight member 43 of the out-of-plane weight assembly 38 approaches the plane of rotation 44 of the blade 25, the torsionally flexible blade 25 is twisted about the elastic axis 39 of the blade 25 thereby resulting in a positive angle of twist 62 about the elastic axis 39. The blade 25 is therefore twisted to the position indicated in FIG. 5 when the blade 25 is placed in the rotating condition, wherein the pitch is continuously varied between a zero pitch variation at the radially inner fix end 30 and a maximum pitch variation adjacent the out-of-plane weight assembly 38.

The theory of operation of the pitch adjusting feature of the out-of-plane weight assembly 38 is explained in greater detail in U.S. Pat. No. 4,291,235, issued to Karl H. Bergey on Sep. 22, 1981, the disclosure of which is hereby incorporated by reference. Also, while the blade assembly 16 has been described as having a single out-of-plane weight assembly, it will be understood that a plurality of out-of-plane weight assemblies can be positioned along the span of the blade angle thereby tailoring the blade distribution along the blade span in ways that are less linear. Such arrangements of plural out-of-plane weight assemblies may provide improvements in both aerodynamic performance and ride quality over a wider variety of flight conditions.

Figure 6:
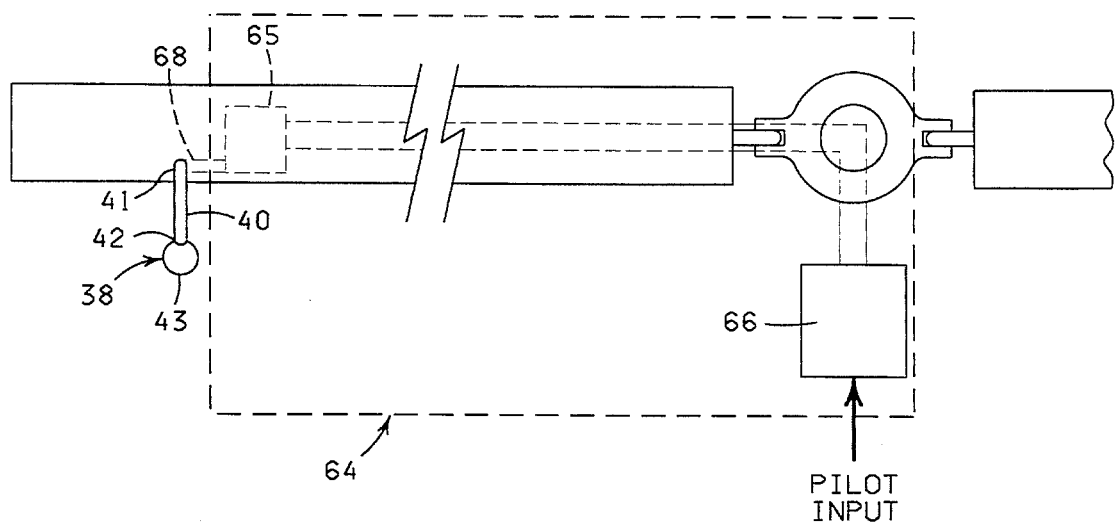
FIG. 6 is a partial plan view, partial schematic of the helicopter blade assembly showing a control mechanism for the out-of-plane weight assembly.

Referring now to FIG. 6, a schematic of a control mechanism 64 for selectively controlling the position of the weight member 43 of the out-of-plane weight assembly 38 is illustrated. A powered servo actuator 65 is operably connected to a control unit 66 whereby the pilot may control the placement of the weight member 43 of the out-of-plane weight assembly 38 from the cockpit. The servo actuator 65 and control unit 66 are elements well known in the art, therefore no further description of their features will be made herein. The servo actuator 65 is connected to a shaft 68 which is connected to the first end 41 of the body member 40 of the out-of-plane weight assembly 38. Upon receipt of appropriate signals from the control unit 66, the servo actuator 65 rotates the shaft 68 which moves the out-of-plane weight assembly 38 to the desired position.

Figure 7:
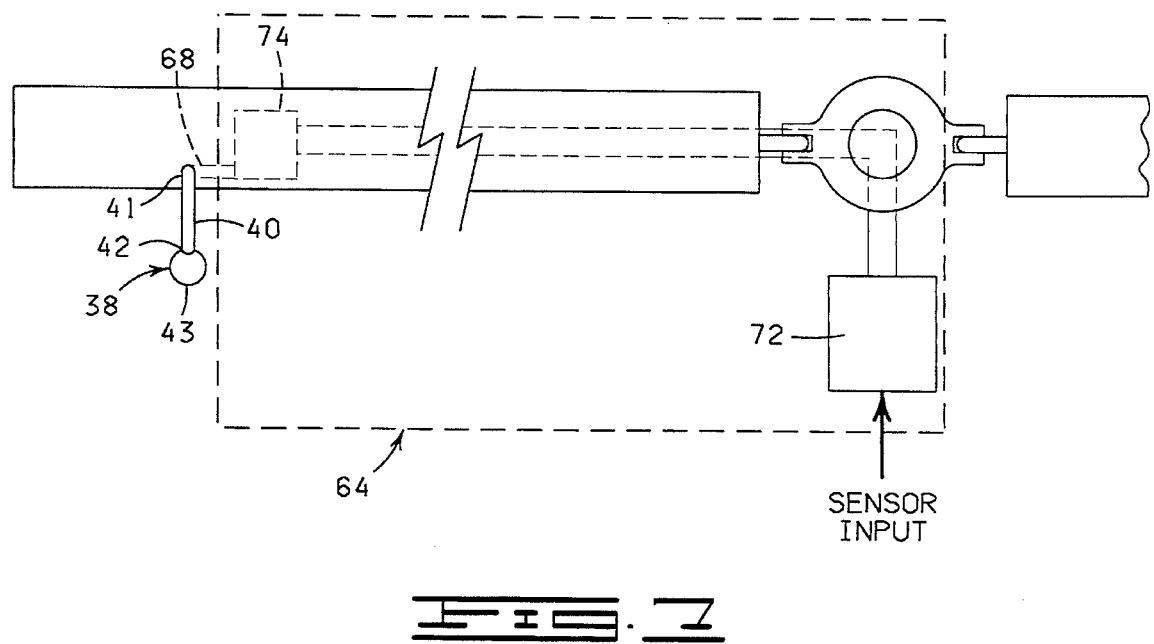
FIG. 7 is a partial plan view, partial schematic of the helicopter blade assembly showing another embodiment of a control mechanism for the out-of-plane weight assembly.

FIG. 7 shows another embodiment of a control mechanism 70. A control unit 72, to which a servo actuator 74 is operably connected, comprises a flight control system which receives signals from a multiplicity of sensors that continuously monitor flight parameters, such as rotor RPM, vehicle velocity through the air, angle of attack, blade loads, and blade dynamics. The servo actuator 74 adjusts the position of the out-of-plane weight assembly 38 (and thereby the twist of the blade 25) in accordance with rotary wing aircraft control laws to optimize the twist of the blade 25 for the existing flight conditions. In this type of system, the servo actuator 74 is programmed to move the weight member 43 of the out-of-plane weight assembly 38 according to a predetermined schedule which is dependent upon the status of the monitored flight conditions.

Changes may be made in the embodiment of the invention described herein, or in parts or elements of the embodiment described herein without departing from the spirit and/or scope of the invention as defined in the following claims.

What is claimed is:

1. A variable pitch rotor blade assembly for a rotary wing aircraft, the rotor blade assembly comprising:

a blade having an inner end and an outer end, the blade having a torsionally flexible portion extending from the outer end a distance toward the inner end and an elastic axis extending through the torsionally flexible portion of the blade, wherein the blade is rotatable on a plane of rotation and the torsionally flexible portion of the blade is twistable about the elastic axis;

out-of-plane weight means pivotally supported by the torsionally flexible portion of the blade for varying the pitch of the torsionally flexible portion of the blade; and control means for selectively positioning the out-of-plane weight means away from the plane of rotation of the blade so that, upon rotation of the blade, the rotational movement imparted thereto causes the out-of-plane weight means to move toward the plane of rotation of the blade so that the pitch of the torsionally flexible portion of the blade is varied to a degree dependent upon the position of the out-of-plane weight means thereby selectively adjusting the pitch of the torsionally flexible portion of the blade to maximize aerodynamic performance of the blade.

2. The rotor blade assembly of claim 1 wherein the out-of-plane weight means comprises a weight member having a center of mass selectively positionable away from the plane of rotation of the blade so that a component of centrifugal force acting on the weight member due to the rotation of the blade moves the weight member toward the plane of rotation and thereby twists the blade about the elastic axis of the blade to continuously vary the pitch of the blade between a zero pitch variation at the inner end and a maximum pitch variation adjacent the weight member.

3. The rotor blade assembly of claim 2 wherein the weight member of the out-of-plane weight means is selectively movable between a first position wherein the weight member is positioned above the plane of rotation of the blade and a second position wherein the weight member is positioned below the plane of rotation of the blade.

4. The rotor blade assembly of claim 3 wherein the center of mass of the weight member of the out-of-plane weight means is positioned forward the elastic axis of the blade to reduce blade flutter.

5. The rotor blade assembly of claim 4 wherein the weight member of the out-of-plane weight means is connected to the leading edge of the blade in close proximity to the outer end of the blade whereby the pitch of the blade is varied about the elastic axis of the blade along substantially the entire length of the torsionally flexible portion of the blade.

6. The rotor blade assembly of claim 1 wherein the control means comprises a powered servo actuator connected to the out-of-plane weight means, the powered servo actuator being operably connected to a control unit wherein the movement of the out-of-plane weight means is controlled by the electro-activated servo in response to signals received from the control unit.

7. A variable pitch rotor blade assembly for a rotary wing aircraft, the rotor blade assembly comprising:

a blade having a leading edge, a trailing edge, a radially inner fixed end, and a radially outer free end, the blade having a torsionally flexible portion extending from the radially outer free end a distance toward the radially inner fixed end and an elastic axis extending through the torsionally flexible portion of the blade, wherein the blade is rotatable on a plane of rotation of the blade and the torsionally flexible portion of the blade is twistable about the elastic axis;

an out-of-plane weight assembly comprising a body member and a weight member, the body member having a first end and a second end wherein the first end is pivotally connected to the leading edge of the blade along the torsionally flexible portion thereof and the second end is connected to the weight member with the weight member being positioned ahead of the leading edge of the blade; and control means operably connected to the body member of the out-of-plane weight assembly for positioning the weight member away from the plane of rotation of the blade so that, upon rotation of the blade, the rotational movement imparted thereto causes the out-of-plane weight means to move toward the plane of rotation of the blade so that the pitch of the torsionally flexible portion of the blade is varied to a degree dependent upon the position of the out-of-plane weight means thereby selectively adjusting the pitch of the torsionally flexible portion of the blade to maximize aerodynamic performance of the blade.

8. The rotor blade assembly of claim 7 wherein the weight member of the out-of-plane weight assembly is selectively movable between a first position wherein the weight member is positioned above the plane of rotation of the blade and a second position wherein the weight member is positioned below the plane of rotation of the blade.

9. The rotor blade assembly of claim 8 wherein the center of mass of the weight member of the out-of-plane weight means is positioned forward the elastic axis of the blade to reduce blade flutter.

10. The rotor blade assembly of claim 9 wherein the weight member of the out-of-plane weight assembly is connected to the leading edge of the blade in close proximity to the radially outer free end of the blade whereby the pitch of the blade is continously varied about the elastic axis of the blade along substantially the entire length of the torsionally flexible portion of the blade between a zero pitch variation at the radially inner fixed end and a maximum pitch variation adjacent the out-of-plane weight assembly.

11. The rotor blade assembly of claim 7 wherein the control means comprises a powered servo actuator connected to the out-of-plane weight assembly, the servo actuator being operably connected to a control unit wherein the movement of the out-of-plane weight assembly is controlled by the servo actuator in response to signals received from the control unit.

12. A variable pitch rotor blade assembly for a rotary wing aircraft, the rotor blade assembly comprising:

a blade having a leading edge, a trailing edge, an inner end, and an outer end, the blade having a torsionally flexible portion extending from the outer end a distance toward the inner end and an elastic axis extending through the torsionally flexible portion of the blade, wherein the blade is rotatable on a plane of rotation of the blade and the torsionally flexible portion of the blade is twistable about the elastic axis;

an out-of-plane weight assembly comprising a body member and a weight member, the body member having a first end and a second end wherein the first end is pivotally connected to the leading edge of the blade along the torsionally flexible portion thereof and the second end is connected to the weight member with the weight member being positioned ahead of the leading edge of the blade; and control means operably connected to the body member of the out-of-plane weight assembly for positioning the weight member away from the plane of rotation of the blade so that, upon rotation of the blade, the rotational movement imparted thereto causes the out-of-plane weight means to move toward the plane of rotation of the blade so that the pitch of the torsionally flexible portion of the blade is varied to a degree dependent upon the position of the out-of-plane weight means thereby selectively adjusting the pitch of the torsionally flexible portion of the blade to maximize aerodynamic performance of the blade.

13. The rotor blade assembly of claim 12 wherein the weight member of the out-of-plane weight assembly is selectively movable between a first position wherein the weight member is positioned above the plane of rotation of the blade and a second position wherein the weight member is positioned below the plane of rotation of the blade.

14. The rotor blade assembly of claim 13 wherein the center of mass of the weight member of the out-of-plane weight assembly is positioned forward the elastic axis of the blade to reduce blade flutter.

15. The rotor blade assembly of claim 14 wherein the weight member of the out-of-plane weight assembly is connected to the leading edge of the blade in close proximity to the outer end of the blade whereby the pitch of the blade is varied about the elastic axis of the blade along substantially the entire length of the torsionally flexible portion of the blade between a zero pitch variation at the inner end and a maximum pitch variation adjacent the out-of-plane weight assembly.

16. The rotor blade assembly of claim 12 wherein the control means comprises a powered servo actuator connected to the out-of-plane weight assembly, the servo actuator being operably connected to a control unit wherein the movement of the out-of-plane weight assembly is controlled by the servo actuator in response to signals received from the control unit.

* * * * *